US012570833B2

(12) United States Patent
Pinnow et al.

(10) Patent No.: US 12,570,833 B2
(45) Date of Patent: Mar. 10, 2026

(54) SILANE FUNCTIONAL AMINE COMPOSITIONS AND THEIR USE IN RUBBER

(71) Applicant: Momentive Performance Materials Inc., Waterford, NY (US)

(72) Inventors: Matthew J. Pinnow, Tarrytown, NY (US); Adeyemi A. Adepetun, Charlotte, NC (US); Richard W. Cruse, Tarrytown, NY (US); Lesley Hwang, Chappaqua, NY (US); Nancy Winchester, Charlotte, NC (US); Linda Vecere, Tarrytown, NY (US); Yanjun Zhu, Tarrytown, NY (US)

(73) Assignee: MOMENTIVE PERFORMANCE MATERIALS INC., Niskayuna, NY (US)

( * ) Notice: Subject to any disclaimer, the term of this patent is extended or adjusted under 35 U.S.C. 154(b) by 605 days.

(21) Appl. No.: 18/064,169

(22) Filed: Dec. 9, 2022

(65) Prior Publication Data

US 2023/0183453 A1 Jun. 15, 2023

Related U.S. Application Data

(60) Provisional application No. 63/288,325, filed on Dec. 10, 2021.

(51) Int. Cl.

| | |
|---|---|
| ***C08K 5/544*** | (2006.01) |
| ***B60C 1/00*** | (2006.01) |
| ***C08F 136/06*** | (2006.01) |
| ***C08F 136/08*** | (2006.01) |
| ***C08K 3/36*** | (2006.01) |
| ***C08K 5/548*** | (2006.01) |

(52) U.S. Cl.

CPC ............ *C08K 5/544* (2013.01); *B60C 1/0016* (2013.01); *C08F 136/06* (2013.01); *C08F 136/08* (2013.01); *C08K 3/36* (2013.01); *C08K 5/548* (2013.01); *C08K 2201/006* (2013.01)

(58) Field of Classification Search

None

See application file for complete search history.

(56) References Cited

U.S. PATENT DOCUMENTS

| | | | |
|---|---|---|---|
| 4,997,860 | A | 3/1991 | Kabeta |
| 5,025,047 | A | 6/1991 | Wolff et al. |
| 11,018,371 | B1 | 5/2021 | Ji et al. |
| 2005/0100738 | A1 | 5/2005 | Hirota et al. |
| 2006/0269760 | A1 | 11/2006 | Sugama |
| 2011/0007489 | A1 | 1/2011 | Ohigashi et al. |
| 2012/0149831 | A1 | 6/2012 | Nagahama et al. |
| 2014/0221525 | A1 | 8/2014 | Kojima |
| 2020/0140662 | A1 | 5/2020 | York et al. |

FOREIGN PATENT DOCUMENTS

| | | | |
|---|---|---|---|
| EP | 3135500 | B1 | 5/2019 |
| WO | WO-0004029 | A2 | 1/2000 |

OTHER PUBLICATIONS

Adima et al. Chiral organic-inorganic solids as enantioselective catalytic materials J. Mater. Chem, 1997, 7 (12), 2331-2333. (Year: 1997).*

"PubChem CID 13147680," Create date: Feb. 8, 2007, Retrieved from https://pubchem.ncbi.nlm.nih.gov/compound/13147680, 11 pages.

"PubChem CID 69082511," Create date: Nov. 30, 2012, Retrieved from https://pubchem.ncbi.nlm.nih.gov/compound/69082511, 8 pages.

Notification of Transmittal of The International Search Report and The Written Opinion of the International Searching Authority for International Application No. PCT/US2022/81281, mailed May 4, 2023, 5 pages.

El-Ashgar, N.M., et al., "Extraction of Co, Ni, Cu, Zn and Cd ions using 2-aminophenylaminopropylpolysiloxane," *Environmental Chemistry Letters* 8:311-316, Springer, Verlag (May 21, 2009).

* cited by examiner

*Primary Examiner* — Katarzyna I Kolb

(74) *Attorney, Agent, or Firm* — Sterne, Kessler, Goldstein & Fox P.L.L.C.

(57) ABSTRACT

The present disclosures are directed to a composition comprising at least one silane functional amine; a method of preparing a silane functional amine; a rubber composition comprising at least one silane functional amine, at least one diene-based polymer, silica, at least one process aid, and a vulcanizing package comprising at least one vulcanizing agent comprising sulfur and at least one accelerator; and a process of preparing a rubber composition.

22 Claims, 1 Drawing Sheet

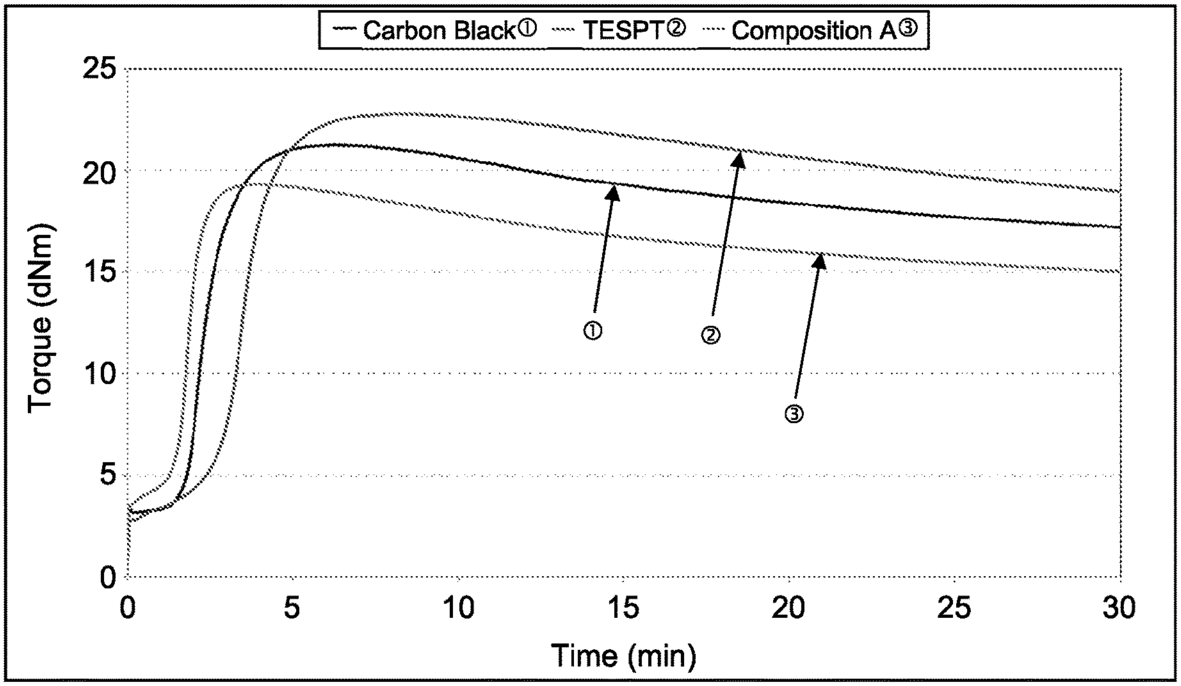
Carbon Black①
TESPT②
Composition A③
25
20
15
10
5
0
Torque (dNm)
0
5
10
15
20
25
30
Time (min)
①
②
③

SILANE FUNCTIONAL AMINE COMPOSITIONS AND THEIR USE IN RUBBER

FIELD OF THE DISCLOSURE

The present disclosure relates to a composition comprising at least one silane functional amine and a method for preparing at least one silane functional amine. The present disclosure further relates to a rubber composition comprising a composition comprising at least one silane functional amine, at least one diene-based polymer, silica, at least one process aid, and a vulcanizing package, as well as a process of preparing a rubber composition.

BACKGROUND

Tire treads historically have been formulated using carbon black and natural rubber due to their good wear and tear properties. A disadvantage to using carbon black and natural rubber is that the rubber tread compounds produced have high hysteresis (i.e., high rolling resistance), which has a negative impact on fuel efficiency. Regulatory drivers, which include Corporate Average Fuel Economy (CAFE) standards, Green House Gas (GHG) regulations, Environmental Protection Agency (EPA) regulations and European Tire Labelling regulations, have put a premium on energy savings. As a result, tire manufacturers are increasingly striving to make tires with lower rolling resistance while maintaining good wear and tear properties.

One approach to improve rolling resistance (lower hysteresis) is to use a sulfur-containing silane and a silica filler, which is very effective for tires made from synthetic rubber. However, when standard sulfur-containing silanes are used in natural rubber silica formulations, the wear and tear properties suffer compared to carbon black natural rubber formulations. It has been a longstanding goal of the tire industry to produce a natural rubber-based tread compound that has good wear/tear properties similar to carbon black natural rubber formulations, as well as low rolling resistance similar to sulfur-containing silane natural rubber silica formulations.

There remains a need for a natural rubber tread compound to be produced with both good wear/tear properties and low hysteresis properties.

BRIEF SUMMARY OF THE DISCLOSURE

A composition disclosed herein comprises at least one silane functional amine, wherein the at least one silane functional amine is a compound of formula (I): $(R^1)_a$-G-$(NR_2)_b$; and further wherein:

- G is a saturated or unsaturated cyclic moiety;
- each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- each R is independently selected from the group consisting of hydrogen and -L-$SiX^1X^2X^3$; with the proviso that at least one R is hydrogen and at least one R is -L-$SiX^1X^2X^3$;
- each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;
- each $X^1$ is independently selected from the group consisting of hydroxyl, —$OR^2$ and —OC(═O)$R^2$;
- each $X^2$ and each $X^3$ are independently selected from the group consisting of hydroxyl, —$OR^2$, —OC(═O)$R^2$ and $R^2$;
- each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- a is 0, 1, 2, 3, 4, 5, 6, 7, 8, 9, 10, or 11; and
- b is 1 or 2.

The disclosure further relates to a method for preparing at least one silane functional amine comprising reacting a compound of formula (II): $(R^1)_a$-G-$(NH_2)_b$, with one or more compounds of formula (III): M-L-$SiX^1X^2X^3$; and wherein the molar ratio of total compounds of formula (III) to a compound of formula (II) is equal to or less than 2b-1; and further wherein:

- G is a saturated or unsaturated cyclic moiety;
- each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;
- each $X^1$ is independently selected from the group consisting of hydroxyl, —$OR^2$ and —OC(═O)$R^2$;
- each $X^2$ and each $X^3$ are independently selected from the group consisting of hydroxyl, —$OR^2$, —OC(═O)$R^2$ and $R^2$;
- each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- each M is independently halogen;
- a is 0, 1, 2, 3, 4, 5, 6, 7, 8, 9, 10, or 11; and
- b is 1 or 2.

The disclosure further relates to a rubber composition comprising:

- a. the composition comprising at least one silane functional amine;
- b. at least one diene-based polymer;
- c. silica;
- d. at least one process aid; and
- e. a vulcanizing package comprising at least one vulcanizing agent comprising sulfur and at least one accelerator.

The disclosure further provides a rubber composition comprising:

- (i) about 100 parts of rubber, where the weight of the rubber is the sum of the weights of each diene-based polymer containing at least one functional group used in the formulation and the weights of each diene-based polymer containing no functional group used in the formulation;

(ii) about 1 to about 20 parts by weight per 100 parts rubber (i) of the composition comprising at least one silane functional amine;

(iii) about 5 to about 140 parts by weight per 100 parts rubber (i) of silica;

(iv) about 0.1 to about 10 parts by weight per 100 parts rubber (i) of at least one process aid; and (v) about 0.1 to about 20 parts by weight per 100 parts rubber (i) of a vulcanization package comprising at least one vulcanizing agent comprising sulfur and at least one accelerator.

The disclosure also provides a process of preparing a rubber composition comprising adding the composition comprising at least one silane functional amine, and silica to at least one diene-based polymer.

The disclosure provides the process further comprises adding at least one process aid at the same time as a vulcanization package comprising at least one vulcanizing agent comprising sulfur and at least one accelerator.

The disclosure provides a rubber composition comprising:

a. about 0.05% to about 12% by weight of a composition comprising at least one silane functional amine;
b. about 5% to about 70% by weight of at least one diene-based polymer;
c. about 10% to about 40% by weight of silica;
d. about 0.05% to about 5% by weight of at least one process aid; and
e. about 0.05% to about 5% by weight of a vulcanization package comprising at least one vulcanizing agent comprising sulfur and at least one accelerator.

The disclosure further provides a rubber composition prepared by the process.

The disclosure also provides an article of manufacture comprising the rubber composition.

BRIEF DESCRIPTION OF THE FIGURES

The accompanying FIGURE, which is incorporated herein, forms part of the specification and illustrates embodiments of the present disclosure. Together with the description, the FIGURE further serves to explain the principles of and to enable a person skilled in the relevant art(s) to make and use the disclosed embodiments. The FIGURE is intended to be illustrative, not limiting.

FIG. 1 is a line graph showing the rheometric cure behavior, including scorch safety, of rubber composition comprising Composition A is comparable to rubber composition comprising carbon black or TESPT.

DETAILED DESCRIPTION

As used above, and throughout the description, the following terms, unless otherwise indicated, shall be understood to have the following meanings.

Unless stated otherwise, the terms "a" and "an" and "the" and similar references used in the context of describing a particular aspect of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein.

Furthermore, "and/or", where used herein, is to be taken as specific disclosure of each of the two specified features or components with or without the other. Thus, the term "and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

It is understood that wherever aspects are described herein with the language "comprising," otherwise analogous aspects described in terms of "consisting of" and/or "consisting essentially of" are also provided.

The term "polymer" means a substance, chemical compound or mixture of compounds, that has a molecular structure consisting chiefly or entirely of a large number of similar units (e.g., monomer units) bonded together.

The term "functionalized diene-based polymer" is synonymous, and therefore interchangeable, with "diene-based polymer containing at least one functional group (i)(a)".

The term "non-functionalized diene-based polymer" is synonymous, and therefore interchangeable with "diene-based polymer containing no functional groups (i)(b)".

The term "about" encompasses the range of experimental error that occurs in any measurement. The term "about" includes the recited number ±10%. Thus, "about 10" means 9 to 11.

The term "elastomer" is synonymous, and therefore interchangeable, with "rubber".

The term "vulcanized" is synonymous, and therefore interchangeable, with "cured".

The expression "coupling agent" means an agent capable of establishing an effective chemical and/or physical bond between a diene-based polymer and a filler or means an agent capable of establishing an effective chemical or physical bond between two diene-based polymers. Effective coupling agents have functional groups capable of bonding physically and/or chemically with filler or a second diene-based polymer, as for example, between a silanol group of the coupling agent and the hydroxyl (OH) surface groups of the filler (e.g., surface silanols in the case of silica), or between a silanol group attached to one diene polymer with the silanol group of another polymer, and, as for example, sulfur atoms which are capable of bonding physically and/or chemically with the diene-based polymers as a result of vulcanization (curing).

The term "filler" means a substance that is added to the diene-based polymer (rubber) to either extend the rubber or to reinforce the elastomeric network. Reinforcing fillers are materials whose moduli are higher than the diene-based polymer of the elastomeric composition and are capable of absorbing stress from the diene-based polymer when the elastomer is strained. Fillers include fibers, needles, nanotubes, particulates, and sheet-like structures and can be composed of inorganic minerals, silicates, silica, clay, ceramics, carbon, organic polymer and diatomaceous earth.

The term, "hydrocarbon" as used herein refers to any chemical structure containing hydrogen atoms and carbon atoms.

The term "alkyl" means any monovalent, saturated straight chain or branched chain hydrocarbon group; the term "alkenyl" means any monovalent straight chain or branched chain hydrocarbon group containing one or more carbon-carbon double bonds where the site of attachment of the group can be either at a carbon-carbon double bond or elsewhere therein; and, the term "alkynyl" means any monovalent straight chain or branched chain hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein.

Representative examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

The term "cycloalkyl" means any monovalent cyclic aliphatic hydrocarbon group; the term "cycloalkenyl" means any monovalent cyclic aliphatic hydrocarbon group containing one or more carbon-carbon double bonds where the site of attachment of the group can be either at a carbon-carbon double bond or elsewhere therein; and, the term "cycloalkynyl" means any monovalent cyclic aliphatic hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein.

Representative examples of cycloalkyl include cyclopentyl, cyclobutyl, cyclopentyl, cycloheptyl, cyclooctyl. Examples of cyloalkenyl include cyclopentenyl, cycloheptenyl and cyclooctatrienyl. An example of cycloalkynyl is cycloheptynyl.

The terms "cycloalkyl", "cycloalkenyl", and "cycloalkynyl" include bicyclic, tricyclic and higher cyclic structures as well as the aforementioned cyclic structures further substituted with alkyl, alkenyl, and/or alkynyl groups. Representative examples include norbornyl, norbornenyl, ethylnorbornyl, ethylnorbornenyl, cyclohexyl, ethylcyclohexyl, ethylcyclohexenyl, cyclohexylcyclohexyl and cyclododecatrienyl.

The term "aryl" includes any aromatic hydrocarbon from which one hydrogen atom has been removed; "aralkyl" includes any of the aforementioned alkyl groups in which one or more hydrogen atoms have been substituted by the same number of like and/or different aryl (as defined herein) substituents; and "arenyl" includes any of the aforementioned aryl groups in which one or more hydrogen atoms have been substituted by the same number of like and/or different alkyl (as defined herein) substituents. Specific, non-limiting examples of aryl groups include phenyl and naphthalenyl. Specific, non-limiting examples of aralkyl groups include benzyl and phenethyl. Specific, non-limiting examples of arenyl groups include tolyl and xylyl.

The term "alkylene" is a divalent saturated aliphatic radical derived from an alkane by removal of two hydrogen atoms.

The term "heteroatom" means any of the Group 13-17 elements except carbon and includes, for example, oxygen, nitrogen, silicon, sulfur, phosphorus, fluorine, chlorine, bromine and iodine.

The term "halo" or "halogen" as used by itself or as part of another group refers to —Cl, —F, —Br, or —I.

The term "hydroxy" as used by itself or as part of another group refers to —OH.

The term "alkoxy" as used by itself or as part of another group refers to an optionally substituted alkyl, optionally substituted cycloalkyl, optionally substituted alkenyl or optionally substituted alkynyl attached to a terminal oxygen atom. The alkoxy group is chosen from a $C_{1-20}$ alkyl attached to a terminal oxygen atom, e.g., methoxy, ethoxy, and tert-butoxy.

Other than in the working examples or where otherwise indicated, all numbers expressing amounts of materials, reaction conditions, time durations, quantified properties of materials, and so forth, stated in the specification and claims are to be understood as being modified in all instances by the term "about".

It will be understood that any numerical range recited herein includes all sub-ranges with that range and any combination of the various endpoints of such ranges or sub-ranges.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

A composition disclosed herein comprises at least one silane functional amine, wherein the at least one silane functional amine is a compound of formula (I): $(R^1)_a$-G-$(NR_2)_b$; and further wherein:

- G is a saturated or unsaturated cyclic moiety;
- each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- each R is independently selected from the group consisting of hydrogen and -L-$SiX^1X^2X^3$; with the proviso that at least one R is hydrogen and at least one R is -L-$SiX^1X^2X^3$;
- each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;
- each $X^1$ is independently selected from the group consisting of hydroxyl, —$OR^2$ and —OC(═O)$R^2$;
- each $X^2$ and each $X^3$ are independently selected from the group consisting of hydroxyl, —$OR^2$, —OC(═O)$R^2$ and $R^2$;
- each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- a is 0, 1, 2, 3, 4, 5, 6, 7, 8, 9, 10, or 11; and
- b is 1 or 2.

In some aspects, b is 1, a is 1, 2, 3, 4, 5, 6, 7, 8, 9, 10 or 11, and at least one $R^1$ group at an ortho position to the amino group has at least one alpha hydrogen atom.

In some aspects, b is 1, a is 1, 2, 3, 4, 5, 6, 7, 8, 9, 10 or 11, and at least one $R^1$ group at a para position to the amino group has at least one alpha hydrogen atom.

In some aspects, b is 1, a is 1, 2, 3, 4, 5, 6, 7, 8, 9, 10 or 11, and at least one $R^1$ group is at a meta position to the amino group.

In some aspects, G is a saturated or unsaturated cyclic moiety selected from the group consisting of a benzene ring, a naphthalene ring, an anthracene ring, a cyclopentane ring, a cyclohexane ring, a cycloheptane ring, a cyclooctane ring, a decalin ring, a dioxane ring, a pyridine ring, a pyrimidine ring, a pyran ring, an isoquinoline ring, a quinoline ring, and a xanthene ring.

In some aspects, G is selected from the group consisting of a benzene ring, a cyclohexane ring, and a pyridine ring.

In some aspects, G is a benzene ring, b is 1 or 2, and a is 0, 1, 2, 3, 4, or 5; with the proviso that the sum of a and b is equal to or less than 6.

In some aspects, G is a benzene ring, b is 1, and a is 1, 2, 3, 4, or 5.

In some aspects, G is a benzene ring, b is 2, and a is 0, 1, 2, 3, or 4.

In some aspects, G is a cyclohexane ring, b is 1 or 2, and a is 0, 1, 2, 3, 4, 5, 6, 7, 8, 9, 10, or 11; with the proviso that the sum of a and b is equal to or less than 12.

In some aspects, G is a cyclohexane ring, b is 1, and a is 1, 2, 3, 4, 5, 6, 7, 8, 9, 10, or 11.

In some aspects, G is a cyclohexane ring, b is 2, and a is 0, 1, 2, 3, 4, 5, 6, 7, 8, 9, or 10.

In some aspect, G is a pyridine ring, b is 1 or 2, and a is 0, 1, 2, 3, or 4; with the proviso that the sum of a and b is equal to or less than 5.

In some aspect, G is a pyridine ring, b is 1, and a is 1, 2, 3, or 4.

In some aspect, G is a pyridine ring, b is 2, and a is 0, 1, 2, or 3.

In one aspects, G is a benzene ring, b is 1, a is 1, 2, 3, 4, or 5, one R is -L-$SiX^1X^2X^3$, and the other R is hydrogen.

In some aspects, G is a benzene ring, b is 1, a is 1, one R is -L-$SiX^1X^2X^3$, and the other R is hydrogen.

In some aspects, G is a benzene ring, b is 1, a is 1, one R is -L-$SiX^1X^2X^3$, and the other R is hydrogen; and wherein the $R^1$ group is at an ortho position to the amino group, and the $R^1$ group has at least one alpha hydrogen atom.

In some aspects, G is a benzene ring, b is 1, a is 1, one R is -L-$SiX^1X^2X^3$, and the other R is hydrogen; and wherein the $R^1$ group is at a para position to the amino group, and the $R^1$ group has at least one alpha hydrogen atom.

In some aspects, G is a benzene ring, b is 1, a is 1, one R is -L-$SiX^1X^2X^3$, and the other R is hydrogen; and wherein the $R^1$ group is at a meta position to the amino group.

In some aspects, the compound of formula (I) is

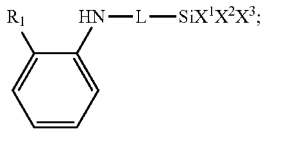

and wherein the $R^1$ group has at least one alpha hydrogen atom.

In some aspects, $R^1$ is selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, $R^1$ is an alkoxyl group having from 1 to 20 carbon atoms, an alkyl group having from 1 to 20 carbon atoms, or an alkenyl group having from 2 to 20 carbon atoms.

In some aspects, $R^1$ is an alkyl group having from 1 to 20 carbon atoms.

In some aspects, $R^1$ is $—CH_2CH_3$.

In some aspects, L is selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms.

In some aspects, L is an alkylene group having from 1 to 20 carbon atoms and optionally at least one heteroatom, an alkenylene group having from 2 to 20 carbon atoms, or an arylene group having from 6 to 12 carbon atoms.

In some aspects, L is an alkylene group having from 1 to 20 carbon atoms and optionally at least one heteroatom.

In some aspects, L is an alkylene group having from 1 to 20 carbon atoms.

In some aspects, L is $—CH_2CH_2CH_2—$.

In some aspects, $X^1$ is hydroxyl, $—OR^2$, or $—OC(=O)R^2$.

In some aspects, $X^2$ is hydroxyl, $—OR^2$, $—OC(=O)R^2$, or $R^2$.

In some aspects, $X^3$ is hydroxyl, $—OR^2$, $—OC(=O)R^2$, or $R^2$.

In some aspects, each $X^1$, $X^2$ and $X^3$ are independently $—OR^2$.

In some aspects, each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, each $R^2$ is independently an alkyl group having from 1 to 20 carbon atoms, an alkenyl group having from 2 to 20 carbon atoms, or an aryl group having from 6 to 12 carbon atoms.

In some aspects, each $R^2$ is independently an alkyl group having from 1 to 20 carbon atoms.

In some aspects, each $R^2$ is independently $—CH_2CH_3$.

In some aspects, the compound of formula (I) is

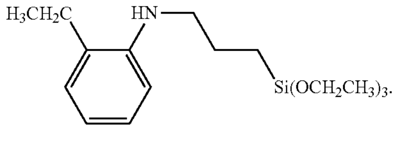

In another aspect, G is a benzene ring, b is 2, a is 0, 1, 2, 3, or 4, at least one R is hydrogen, and at least one R is -L-$SiX^1X^2X^3$.

In some aspects, G is a benzene ring, b is 2, a is 0, at least one R is hydrogen, and at least one R is -L-$SiX^1X^2X^3$.

In some aspects, one amino group is at an ortho position of the other amino group.

In some aspects, one amino group is at a para position of the other amino group.

In some aspects, one amino group is at a meta position of the other amino group.

In some aspects, the compound of formula (I) is selected from the group consisting of

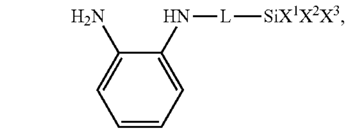

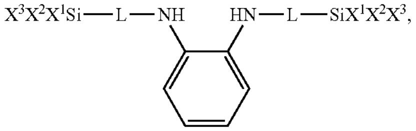

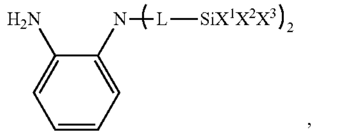

,

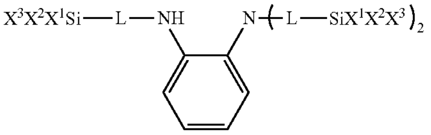

, and combinations thereof.

In some aspects, the compound of formula (I) is

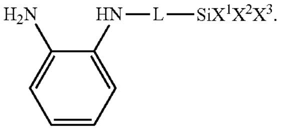

In some aspects, the compound of formula (I) is

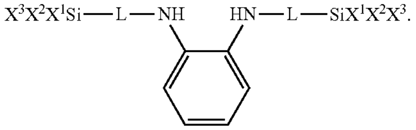

In some aspects, the compound of formula (I) is

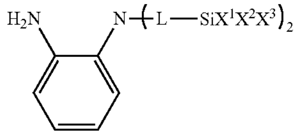

.

In some aspects, the compound of formula (I) is

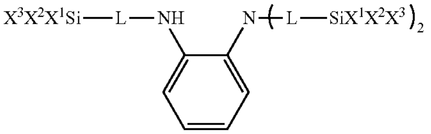

.

In some aspects, each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms.

In some aspects, each L is independently an alkylene group having from 1 to 20 carbon atoms and optionally at least one heteroatom, an alkenylene group having from 2 to 20 carbon atoms, or an arylene group having from 6 to 12 carbon atoms.

In some aspects, each L is independently an alkylene group having from 1 to 20 carbon atoms and optionally at least one heteroatom.

In some aspects, each L is independently an alkylene group having from 1 to 20 carbon atoms.

In some aspects, each L is independently $—CH_2CH_2CH_2—$.

In some aspects, each $X^1$ is independently hydroxyl, $—OR^2$, or $—OC(=O)R^2$.

In some aspects, each $X^2$ is independently hydroxyl, $—OR^2$, $—OC(=O)R^2$, or $R^2$.

In some aspects, each $X^3$ is independently hydroxyl, $—OR^2$, $—OC(=O)R^2$, or $R^2$.

In some aspects, each $X^1$, $X^2$ and $X^3$ are independently $—OR^2$.

In some aspects, each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, each $R^2$ is independently an alkyl group having from 1 to 20 carbon atoms, an alkenyl group having from 2 to 20 carbon atoms, or an aryl group having from 6 to 12 carbon atoms.

In some aspects, each $R^2$ is independently an alkyl group having from 1 to 20 carbon atoms.

In some aspects, each $R^2$ is independently $—CH_2CH_3$.

In some aspects, the compound of formula (I) is selected from the group consisting of

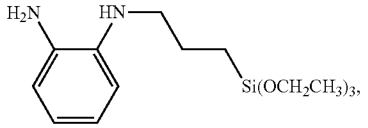

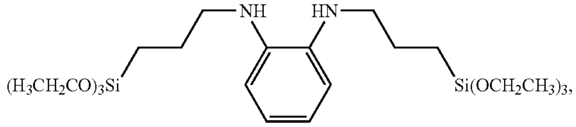

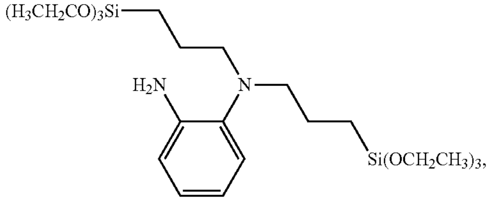

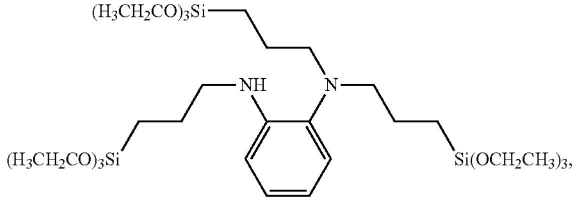

and combinations thereof.

In some aspects, the compound of formula (I) is

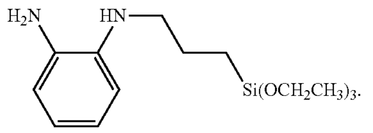

In some aspects, the compound of formula (I) is

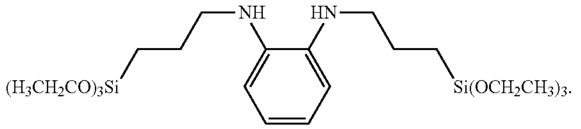

In some aspects, the compound of formula (I) is

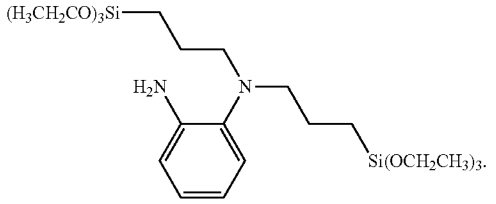

In some aspects, the compound of formula (I) is

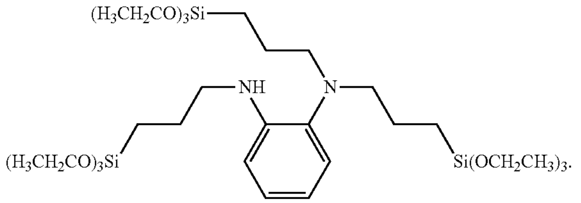

The disclosure further relates to a method for preparing at least one silane functional amine comprising reacting a compound of formula (II): $(R^1)_a$-G-$(NH_2)_b$, with one or more compounds of formula (III): M-L-Si$X^1X^2X^3$; and wherein the molar ratio of total compounds of formula (III) to a compound of formula (II) is equal to or less than 2b-1; and further wherein:

G is a saturated or unsaturated cyclic moiety;

each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;

each $X^1$ is independently selected from the group consisting of hydroxyl, —$OR^2$ and —OC(═O)$R^2$;

each $X^2$ and each $X^3$ are independently selected from the group consisting of hydroxyl, —$OR^2$, —OC(═O)$R^2$ and $R^2$;

each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each M is independently halogen;

a is 0, 1, 2, 3, 4, 5, 6, 7, 8, 9, 10, or 11; and b is 1 or 2.

In some aspects, b is 1, a is 1, 2, 3, 4, 5, 6, 7, 8, 9, 10 or 11, and at least one $R^1$ group at an ortho position to the amino group has at least one alpha hydrogen atom.

In some aspects, b is 1, a is 1, 2, 3, 4, 5, 6, 7, 8, 9, 10 or 11, and at least one $R^1$ group at a para position to the amino group has at least one alpha hydrogen atom.

In some aspects, b is 1, a is 1, 2, 3, 4, 5, 6, 7, 8, 9, 10 or 11, and at least one $R^1$ group is at a meta position to the amino group.

In some aspects, the molar ratio of total compounds of formula (III) to a compound of formula (II) is from about 3.0 to about 0.1, from about 2.9 to about 0.1, from about 2.8 to about 0.1, from about 2.7 to about 0.2, from about 2.6 to about 0.2, from about 2.5 to about 0.2, from about 2.4 to about 0.3, from about 2.3 to about 0.3, from about 2.2 to about 0.4, from about 2.1 to about 0.4, from about 2.0 to about 0.5, from about 1.9 to about 0.5, from about 1.8 to about 0.6, from about 1.7 to about 0.6, from about 1.6 to about 0.7, from about 1.5 to about 0.7, from about 1.4 to about 0.8, from about 1.3 to about 0.8, from about 1.2 to about 0.9, or from about 1.1 to about 0.9. In some aspects, the molar ratio of total compounds of formula (III) to a compound of formula (II) is about 1.

In some aspects, G is a saturated or unsaturated cyclic moiety selected from the group consisting of a benzene ring, a naphthalene ring, an anthracene ring, a cyclopentane ring, a cyclohexane ring, a cycloheptane ring, a cyclooctane ring, a decalin ring, a dioxane ring, a pyridine ring, a pyrimidine ring, a pyran ring, an isoquinoline ring, a quinoline ring, and a xanthene ring.

In some aspects, G is selected from the group consisting of a benzene ring, a cyclohexane ring, and a pyridine ring.

In some aspects, G is a benzene ring, b is 1 or 2, and a is 0, 1, 2, 3, 4, or 5; with the proviso that the sum of a and b is equal to or less than 6.

In some aspects, G is a benzene ring, b is 1, and a is 1, 2, 3, 4, or 5.

In some aspects, G is a benzene ring, b is 2, and a is 0, 1, 2, 3, or 4.

In some aspects, G is a cyclohexane ring, b is 1 or 2, and a is 0, 1, 2, 3, 4, 5, 6, 7, 8, 9, 10, or 11; with the proviso that the sum of a and b is equal to or less than 12.

In some aspects, G is a cyclohexane ring, b is 1, and a is 1, 2, 3, 4, 5, 6, 7, 8, 9, 10, or 11.

In some aspects, G is a cyclohexane ring, b is 2, and a is 0, 1, 2, 3, 4, 5, 6, 7, 8, 9, or 10.

In some aspects, G is a pyridine ring, b is 1 or 2, and a is 0, 1, 2, 3, or 4; with the proviso that the sum of a and b is equal to or less than 5.

In some aspect, G is a pyridine ring, b is 1, and a is 1, 2, 3, or 4.

In some aspect, G is a pyridine ring, b is 2, and a is 0, 1, 2, or 3.

In one aspect, G is a benzene ring, b is 1, and a is 1, 2, 3, 4, or 5; and wherein the molar ratio of a compound of formula (III) to a compound of formula (II) is equal to or less than 1.5.

In one aspect, G is a benzene ring, b is 1, and a is 1, 2, 3, 4, or 5; and wherein the molar ratio of a compound of formula (III) to a compound of formula (II) is equal to or less than 1.

In some aspects, G is a benzene ring, b is 1, and a is 1; and wherein the molar ratio of a compound of formula (III) to a compound of formula (II) is equal to or less than 1.5.

In some aspects, G is a benzene ring, b is 1, and a is 1; and wherein the molar ratio of a compound of formula (III) to a compound of formula (II) is equal to or less than 1.

In some aspects, G is a benzene ring, b is 1, and a is 1; and wherein the molar ratio of a compound of formula (III) to a compound of formula (II) is equal to or less than 1.5; the $R^1$ group is at an ortho position to the amino group; and the $R^1$ group has at least one alpha hydrogen atom.

In some aspects, G is a benzene ring, b is 1, and a is 1; and wherein the molar ratio of a compound of formula (III) to a compound of formula (II) is equal to or less than 1; the $R^1$ group is at an ortho position to the amino group; and the $R^1$ group has at least one alpha hydrogen atom.

In some aspects, G is a benzene ring, b is 1, and a is 1; and wherein the molar ratio of a compound of formula (III) to a compound of formula (II) is equal to or less than 1.5; the $R^1$ group is at an ortho position to the amino group; and the $R^1$ group has at least one alpha hydrogen atom.

In some aspects, G is a benzene ring, b is 1, and a is 1; and wherein the molar ratio of a compound of formula (III) to a compound of formula (II) is equal to or less than 1; the $R^1$ group is at a para position to the amino group; and the $R^1$ group has at least one alpha hydrogen atom.

In some aspects, G is a benzene ring, b is 1, and a is 1; and wherein the molar ratio of a compound of formula (III) to a compound of formula (II) is equal to or less than 1.5; and the $R^1$ group is at a meta position to the amino group.

In some aspects, G is a benzene ring, b is 1, and a is 1; and wherein the molar ratio of a compound of formula (III) to a compound of formula (II) is equal to or less than 1; and the $R^1$ group is at a meta position to the amino group.

In some aspects, the compound of formula (II) is

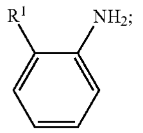

and wherein the $R^1$ group has at least one alpha hydrogen atom.

In some aspects, $R^1$ is selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, $R^1$ is an alkoxyl group having from 1 to 20 carbon atoms, an alkyl group having from 1 to 20 carbon atoms, or an alkenyl group having from 2 to 20 carbon atoms.

In some aspects, $R^1$ is an alkyl group having from 1 to 20 carbon atoms.

In some aspects, $R^1$ is $—CH_2CH_3$.

In some aspects, the compound of formula (II) is

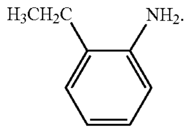

In some aspects, the at least one silane functional amine is prepared by reacting the compound of formula (II):

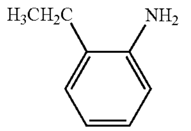

with a compound of formula (III): $M\text{-}L\text{-}SiX^1X^2X^3$; and wherein the molar ratio of a compound of formula (III) to a compound of formula (II) is equal to or less than 1.5.

In some aspects, the at least one silane functional amine is prepared by reacting the compound of formula (II):

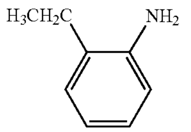

with a compound of formula (III): $M\text{-}L\text{-}SiX^1X^2X^3$; and wherein the molar ratio of a compound of formula (III) to a compound of formula (II) is equal to or less than 1.

In some aspects, L is selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms.

In some aspects, L is an alkylene group having from 1 to 20 carbon atoms and optionally at least one heteroatom, an alkenylene group having from 2 to 20 carbon atoms, or an arylene group having from 6 to 12 carbon atoms.

In some aspects, L is an alkylene group having from 1 to 20 carbon atoms and optionally at least one heteroatom.

In some aspects, L is $—CH_2CH_2CH_2—$.

In some aspects, $X^1$ is hydroxyl, $—OR^2$, or $—OC(=O)R^2$.

In some aspects, $X^2$ is hydroxyl, $—OR^2$, $—OC(=O)R^2$, or $R^2$.

In some aspects, $X^3$ is hydroxyl, $—OR^2$, $—OC(=O)R^2$, or $R^2$.

In some aspects, each $X^1$, $X^2$ and $X^3$ are independently $—OR^2$.

In some aspects, each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, each $R^2$ is independently an alkyl group having from 1 to 20 carbon atoms.

In some aspects, each $R^2$ is independently —$CH_2CH_3$.

In some aspects, M is halogen.

In some aspects, M is chloro, bromo, or iodo.

In some aspects, M is chloro.

In some aspects, the compound of formula (III) is

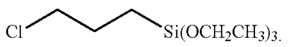

In some aspects, the molar ratio of a compound of formula (III) to a compound of formula (II) is equal to or less than 1.5

In some aspects, the molar ratio of a compound of formula (III) to a compound of formula (II) is from about 1.0 to about 0.1, from about 0.8 to about 0.2, from about 0.7 to about 0.3, or from about 0.6 to about 0.4. In some aspects, the molar ratio of a compound of formula (III) to a compound of formula (II) is about 0.5.

In another aspect, G is a benzene ring, b is 2, and a is 0, 1, 2, 3, or 4; and wherein the molar ratio of total compounds of formula (III) to a compound of formula (II) is equal to or less than 3.

In some aspects, G is a benzene ring, b is 2, and a is 0; and wherein the molar ratio of total compounds of formula (III) to a compound of formula (II) is equal to or less than 3.

In some aspects, one amino group is at an ortho position of the other amino group.

In some aspects, one amino group is at a para position of the other amino group.

In some aspects, one amino group is at a meta position of the other amino group.

In some aspects, the compound of formula (II) is

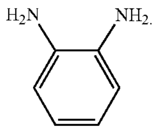

In some aspects, the at least one silane functional amine is prepared by reacting the compound of formula (II):

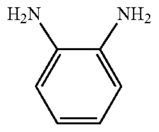

with one or more compounds of formula (III): M-L-$SiX^1X^2X^3$; and wherein the molar ratio of total compounds of formula (III) to a compound of formula (II) is equal to or less than 3.

In some aspects, the at least one silane functional amine is prepared by reacting the compound of formula (II):

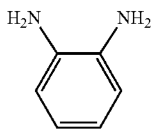

with three compounds of formula (III): M-L-$SiX^1X^2X^3$; and wherein the molar ratio of total compounds of formula (III) to a compound of formula (II) is equal to or less than 3.

In some aspects, the at least one silane functional amine is prepared by reacting the compound of formula (II):

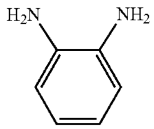

with two compounds of formula (III): M-L-$SiX^1X^2X^3$; and wherein the molar ratio of total compounds of formula (III) to a compound of formula (II) is equal to or less than 3.

In some aspects, the at least one silane functional amine is prepared by reacting the compound of formula (II):

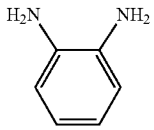

with one compound of formula (III): M-L-$SiX^1X^2X^3$; and wherein the molar ratio of a compound of formula (III) to a compound of formula (II) is equal to or less than 3.

In some aspects, L is selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms.

In some aspects, L is an alkylene group having from 1 to 20 carbon atoms and optionally at least one heteroatom.

In some aspects, L is —$CH_2CH_2CH_2$—.

In some aspects, $X^1$ is hydroxyl, —$OR^2$, or —OC(═O)$R^2$.

In some aspects, $X^2$ is hydroxyl, —$OR^2$, —OC(═O)$R^2$, or $R^2$.

In some aspects, $X^3$ is hydroxyl, —$OR^2$, —OC(═O)$R^2$, or $R^2$.

In some aspects, each $X^1$, $X^2$ and $X^3$ are independently —$oR^2$.

In some aspects, each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms.

In some aspects, each $R^2$ is independently an alkyl group having from 1 to 20 carbon atoms.

In some aspects, each $R^2$ is independently —$CH_2CH_3$.

In some aspects, M is halogen.

In some aspects, M is chloro, bromo, or iodo.

In some aspects, M is chloro.

In some aspects, the compound of formula (III) is

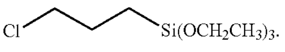

In some aspects, the reaction occurs in the presence of a base.

In some aspects, the base is an alkali metal alkoxide.

In some aspects, the base is sodium ethoxide.

In some aspects, the molar ratio of a compound of formula (III) to a compound of formula (II) is from about 3.0 to about 0.1, from about 2.9 to about 0.1, from about 2.8 to about 0.1, from about 2.7 to about 0.2, from about 2.6 to about 0.2, from about 2.5 to about 0.2, from about 2.4 to about 0.3, from about 2.3 to about 0.3, from about 2.2 to about 0.4, from about 2.1 to about 0.4, from about 2.0 to about 0.5, from about 1.9 to about 0.5, from about 1.8 to about 0.6, from about 1.7 to about 0.6, from about 1.6 to about 0.7, from about 1.5 to about 0.7, from about 1.4 to about 0.8, from about 1.3 to about 0.8, from about 1.2 to about 0.9, or from about 1.1 to about 0.9.

In some aspects, the molar ratio of a compound of formula (III) to a compound of formula (II) is equal to or less than 1.5.

In some aspects, the molar ratio of a compound of formula (III) to a compound of formula (II) is about 1.

In some aspects, the at least one silane functional amine is a compound of formula (I): $(R^1)_a$-G-$(NR_2)_b$ described above.

The disclosure further relates to a rubber composition comprising:

a. the composition comprising at least one silane functional amine of formula (I): $(R^1)_a$-G-$(NR_2)_b$ described above;
b. at least one diene-based polymer;
c. silica;
d. at least one process aid; and
e. a vulcanizing package comprising at least one vulcanizing agent comprising sulfur and at least one accelerator.

In some aspects, the diene-based polymer is a diene-based polymer containing at least one functional group, a diene-based polymer containing no functional group, or combinations thereof.

In some aspects, the diene-based polymer is a diene-based polymer containing at least one functional group.

In some aspects, the diene-based polymer is a diene-based polymer containing no functional group.

In some aspects, the diene-based polymer is natural rubber, cis 1,4-polyisoprene, cis 1,4-polybutadiene, or combinations thereof.

In some aspects, the diene-based polymer is natural rubber.

In some aspects, the diene-based polymer is cis 1,4-polyisoprene.

In some aspects, the diene-based polymer is cis 1,4-polybutadiene.

In some aspects, the diene-based polymer is natural rubber, a polyisoprene, a polybutadiene, styrene-butadiene copolymer (SBR), or combinations thereof.

In some aspects, the process aid is 2,2,4-trimethyl-1,2-dihydroquinoline, octyl triethoxysilane, a triethoxysilylated hydrocarbon, or combinations thereof.

In some aspects, the process aid is 2,2,4-trimethyl-1,2-dihydroquinoline.

In some aspects, the process aid is octyl triethoxysilane.

In some aspects, the process aid is a triethoxysilylated hydrocarbon.

In some aspects, the sulfur in the vulcanizing agent is selected from the group consisting of elemental sulfur, sulfur-donating compounds, and combinations thereof.

In some aspects, the sulfur in the vulcanizing agent is elemental sulfur.

In some aspects, the sulfur in the vulcanizing agent is a sulfur-donating compound.

In some aspects, the accelerator is selected from the group consisting of benzothiazoles, guanidine derivatives, thiocarbamates, and combinations thereof.

In some aspects, the accelerator is benzothiazoles.

In some aspects, the accelerator is guanidine derivatives.

In some aspects, the accelerator is thiocarbamates.

In some aspects, the accelerator is selected from the group consisting of mercapto benzothiazole, benzothiazole disulfide, diphenylguanidine, zinc dithiocarbamate, alkylphenoldisulfide, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropylbenzothiozole-2-sulfenamide, zinc-2-mercaptotoluimidazole, dithiobis(N-methyl piperazine), dithiobis(N-beta-hydroxy ethyl piperazine), dithiobis(dibenzyl amine), and combinations thereof.

In some aspects, the accelerator is N-cyclohexyl-2-benzothiazolesulfenamide.

In some aspects, the accelerator is diphenylguanidine.

In some aspects, the rubber composition further comprises at least one filler.

In some aspects, the filler is selected from the group consisting of titanium dioxide, alumina, aluminosilicates, siliceous materials, carbon black, acetylene black, calcium carbonate, barium sulfate, and combinations thereof.

In some aspects, the filler is carbon black.

In some aspects, the rubber composition further comprises at least one process oil.

In some aspects, the process oil is treated distillate aromatic extracted (TDAE) oil.

In some aspects, the rubber composition further comprises at least one activator.

In some aspects, the activator is zinc oxide.

In some aspects, the activator is stearic acid.

In some aspects, the rubber composition further comprises at least one antidegradant.

In some aspects, the antidegradant is N-(1,3-dimethylbutyl)-N'-phenyl-p-phenylenediamine.

In some aspects, the antidegradant is 2,2,4-trimethyl-1,2-dihydroquinoline polymer.

In some aspects, the antidegradant is a microcrystalline wax.

In some aspects, the at least one silane functional amine is reactive with the at least one diene-based polymer.

In some aspects, the at least one silane functional amine is reactive with the silica.

In some aspects, the composition is curable.

In some aspects, the composition has a Mooney viscosity from about 75 MU to about 160 MU as measured using the ASTM D-1646 method, from about 80 MU to about 160 MU, from about 85 MU to about 160 MU, from about 90 MU to about 160 MU, from about 95 MU to about 160 MU, from about 100 MU to about 155 MU, from about 105 MU to about 155 MU, from about 110 MU to about 155 MU, from about 115 MU to about 155 MU, from about 120 MU to about 155 MU, from about 125 MU to about 150 MU, from about 130 MU to about 150 MU, from about 135 MU to about 150 MU, from about 140 MU to about 148 MU, from about 141 MU to about 147 MU, from about 142 MU to about 146 MU, or from about 143 MU to about 145 MU. In some aspects, the composition has a Mooney viscosity about 144 MU.

In some aspects, the composition has a Mooney scorch, 3 pt rise, of from about 1 minutes to about 20 minutes as measured using the ASTM D-1646 method, from about 1 minutes to about 19 minutes, from about 1 minutes to about 18 minutes, from about 2 minutes to about 17 minutes, from about 2 minutes to about 16 minutes, from about 2 minutes to about 15 minutes, from about 3 minutes to about 14 minutes, from about 3 minutes to about 13 minutes, from about 3 minutes to about 12 minutes, from about 4 minutes to about 11 minutes, from about 5 minutes to about 10 minutes, from about 6 minutes to about 10 minutes, or from about 7 minutes to about 9 minutes. In some aspects, the composition has a Mooney scorch, 3 pt rise, of about 8 minutes.

In some aspects, the composition has a tensile strength of from about 5 MPa to about 30 MPa as measured using the ASTM D-412 method, from about 6 MPa to about 30 MPa, from about 7 MPa to about 29 MPa, from about 8 MPa to about 29 MPa, from about 9 MPa to about 28 MPa, from about 10 MPa to about 28 MPa, from about 11 MPa to about 27 MPa, from about 12 MPa to about 26 MPa, from about 13 MPa to about 25 MPa, from about 14 MPa to about 24 MPa, from about 15 MPa to about 23 MPa, from about 16 MPa to about 22 MPa, from about 17 MPa to about 21 MPa, or from about 18 MPa to about 20 MPa. In some aspects, the composition has a tensile strength of about 19 MPa.

In some aspects, the composition has DIN abrasion loss of from about 80 $mm^3$ to about 120 $mm^3$ as measured using the ASTM D-5963 method, from about 80 $mm^3$ to about 118 $mm^3$, from about 81 $mm^3$ to about 116 $mm^3$, from about 81 $mm^3$ to about 114 $mm^3$, from about 82 $mm^3$ to about 112 $mm^3$, from about 82 $mm^3$ to about 110 $mm^3$, from about 83 $mm^3$ to about 108 $mm^3$, from about 83 $mm^3$ to about 106 $mm^3$, from about 84 $mm^3$ to about 104 $mm^3$, from about 85 $mm^3$ to about 102 $mm^3$, from about 86 $mm^3$ to about 100 $mm^3$, from about 87 $mm^3$ to about 99 $mm^3$, from about 88 $mm^3$ to about 98 $mm^3$, from about 89 $mm^3$ to about 97 $mm^3$, from about 90 $mm^3$ to about 96 $mm^3$, from about 91 $mm^3$ to about 95 $mm^3$, or from about 92 $mm^3$ to about 94 $mm^3$. In some aspects, the composition has DIN abrasion loss of about 93 $mm^3$.

In some aspects, the composition has Rebound at 70° C. of from about 40% to about 80% as measured using the ASTM D-7121-05 method. In some aspects, the composition has Rebound at 70° C. of from about 41% to about 79%, from about 42% to about 78%, from about 43% to about 77%, from about 44% to about 76%, from about 45% to about 75%, from about 46% to about 74%, from about 47% to about 73%, from about 48% to about 72%, from about 49% to about 71%, from about 50% to about 70%, from about 51% to about 69%, from about 52% to about 68%, from about 53% to about 67%, from about 54% to about 66%, from about 55% to about 66%, from about 56% to about 65%, from about 57% to about 65%, from about 58% to about 64%, from about 59% to about 63%, or from about 60% to about 62%. In some aspects, the composition has Rebound at 70° C. of about 61%.

The disclosure further provides a rubber composition comprising:

(i) about 100 parts of rubber, where the weight of the rubber is the sum of the weights of each diene-based polymer containing at least one functional group used in the formulation and the weights of each diene-based polymer containing no functional group used in the formulation;

(ii) about 1 to about 20 parts by weight per 100 parts rubber (i) of the composition comprising at least one silane functional amine of formula (I): $(R^1)_a$-G-$(NR_2)_b$ described above;

(iii) about 5 to about 140 parts by weight per 100 parts rubber (i) of silica;

(iv) about 0.1 to about 10 parts by weight per 100 parts rubber (i) of at least one process aid; and (v) about 0.1 to about 20 parts by weight per 100 parts rubber (i) of a vulcanization package comprising at least one vulcanizing agent comprising sulfur and at least one accelerator.

In some aspects, the composition comprising at least one silane functional amine is from about 1 to about 20 parts by weight per 100 parts rubber, from about 1 to about 18 parts, from about 1 to about 16 parts, from about 2 to about 14 parts, from about 2 to about 12 parts, from about 2 to about 10 parts, from about 3 to about 8 parts, from about 3 to about 6 parts, or from about 3 to about 5 parts. In some aspects, the composition comprising at least one silane functional amine is about 4 parts by weight per 100 parts rubber.

In some aspects, silica is from about 5 to about 140 parts by weight per 100 parts rubber, from about 10 to about 130 parts, from about 15 to about 120 parts, from about 20 to about 110 parts, from about 25 to about 100 parts, from about 30 to about 90 parts, from about 35 to about 80 parts, from about 40 to about 70 parts, from about 40 to about 60 parts, or from about 45 to about 55 parts. In some aspects, silica is about 50 parts by weight per 100 parts rubber.

In some aspects, the at least one process aid is from about 0.1 to about 10 parts by weight per 100 parts rubber, from about 0.1 to about 8 parts, from about 0.1 to about 6 parts, from about 0.1 to about 4 parts, from about 0.1 to about 2 parts, from about 0.1 to about 1 parts, from about 0.1 to about 0.9 parts, from about 0.2 to about 0.8 parts, from about 0.3 to about 0.7 parts or from about 0.4 to about 0.6 parts. In some aspects, the at least one process aid is about 0.5 parts by weight per 100 parts rubber.

In some aspects, a vulcanization package comprising at least one vulcanizing agent comprising sulfur and at least one accelerator is from about 0.1 to about 20 parts by weight per 100 parts rubber, from about 0.5 to about 15 parts, from about 1.0 to about 10 parts, from about 1.5 to about 8 parts, from about 2 to about 6 parts, or from about 3 to about 5 parts. In some aspects, a vulcanization package comprising at least one vulcanizing agent comprising sulfur and at least one accelerator is about 4 parts by weight per 100 parts rubber.

The disclosure also provides a process of preparing a rubber composition comprising adding the composition comprising at least one silane functional amine of formula (I): $(R^1)_a$-G-$(NR_2)_b$ described above, and silica to at least one diene-based polymer.

The disclosure provides the process further comprising adding at least one process aid at the same time as a vulcanization package comprising at least one vulcanizing agent comprising sulfur and at least one accelerator.

In some aspects, the at least one silane functional amine is prepared by a method of comprising reacting a compound of formula (II): $(R^1)_a$-G-$(NH_2)_b$ with one or more compounds of formula (III): M-L-$SiX^1X^2X^3$ described above.

In some aspects, the at least one silane functional amine is reactive with the at least one diene-based polymer.

In some aspects, the at least one silane functional amine is reactive with the silica.

In some aspects, the rubber composition comprises:

a. about 0.05% to about 12% by weight of a composition comprising at least one silane functional amine described above;

b. about 5% to about 70% by weight of at least one diene-based polymer;

c. about 10% to about 40% by weight of silica;

d. about 0.05% to about 5% by weight of at least one process aid; and e. about 0.05% to about 5% by weight of a vulcanization package comprising at least one vulcanizing agent comprising sulfur and at least one accelerator.

In some aspects, the rubber composition comprises from about 0.05% to about 12% by weight of a composition comprising at least one silane functional amine, from about 0.1% to about 11%, from about 0.2% to about 10%, from about 0.3% to about 9%, from about 0.4% to about 8%, from about 0.5% to about 7%, from about 0.6% to about 6%, from about 0.7% to about 5.5%, from about 0.8% to about 5%, from about 0.9% to about 4.5%, from about 1.0% to about 4%, from about 1.25% to about 3.5%, from about 1.5% to about 3.0%, from about 1.75% to about 2.75%, or from about 2.0% to about 2.5%. In some aspects, the rubber composition comprises about 2.25% by weight of a composition comprising at least one silane functional amine.

In some aspects, the rubber composition comprises from about 5% to about 70% by weight of at least one diene-based polymer, from about 15% to about 68%, from about 25% to about 66%, from about 35% to about 64%, from about 45% to about 62%, from about 50% to about 60%, from about 52% to about 59%, from about 54% to about 58%, or from about 55% to about 57%. In some aspects, the rubber composition comprises about 56% by weight of at least one diene-based polymer.

In some aspects, the rubber composition comprises from about 10% to about 40% by weight of silica, from about 15% to about 38%, from about 20% to about 36%, from about 22% to about 34%, from about 24% to about 32%, from about 26% to about 30%, or from about 27% to about 29%. In some aspects, the rubber composition comprises about 28% by weight of silica.

In some aspects, the rubber composition comprises from about 0.05% to about 5% by weight of at least one process aid, from about 0.10% to about 4%, from about 0.15% to about 3%, from about 0.18% to about 2%, from about 0.20% to about 1%, from about 0.21% to about 0.8%, from about 0.22% to about 0.7%, from about 0.23% to about 0.6%, from about 0.24% to about 0.5%, from about 0.25% to about 0.4%, from about 0.26% to about 0.3%, or from about 0.27% to about 0.29%. In some aspects, the rubber composition comprises about 0.28% by weight of at least one process aid.

In some aspects, the rubber composition comprises from about 0.05% to about 5% by weight of a vulcanization package comprising at least one vulcanizing agent comprising sulfur and at least one accelerator, from about 0.10% to about 4.5%, from about 0.50% to about 4%, from about 1% to about 3.5%, from about 1.5% to about 3%, from about 1.75% to about 2.75%, or from about 2% to about 2.5%. In some aspects, the rubber composition comprises about 2.25% by weight of a vulcanization package comprising at least one vulcanizing agent comprising sulfur and at least one accelerator.

The disclosure further provides a rubber composition prepared by the process described above.

The disclosure also provides an article of manufacture comprising the rubber composition described above. In some aspects, the article of manufacture includes but is not limited to a tire, a conveyor belt, an engine mount, and a shoe sole. In some aspects, the article of manufacture is a tire or engine mount.

EXAMPLES

The ingredients for preparing rubber compositions are:

The natural rubber is cis-1,4-polyisoprene rubber, obtainable from HB Chemical under the tradename Standard Indonesian Rubber SIR-20.

The high cis-1,4-polybutadiene rubber is obtained from Chi Mei Corporation under the tradename Kibipol® HBR PR-040G.

The precipitated synthetic amorphous silica is a highly dispersible silica (HDS) micropearl having a BET surface area of 165 $m^2/g$, obtainable from Solvay Group (formerly known as Rhodia) under the tradename ZEOSIL 1165 MP.

The carbon black is obtained from Cabot Corporation under the tradename Vulcan® 9.

The process oil is treated distillate aromatic extracted (TDAE) oil, obtainable from H&R Group under the tradename Vivatec 500.

TESPT silane is bis[3-(triethoxysilyl)propyl] tetrasulfide, obtainable from Struktol Company of America under the tradename SCA 98.

Composition A is a mixture of silane functional amines synthesized by Momentive Performance Materials, Inc.

Activator 1 is zinc oxide, obtainable from Harwick Standard under the trade name Zinc Oxide CR-40.

Activator 2 is stearic acid, obtainable from Harwick Standard under the trade name Stearic Acid F-2000.

The Antidegradant 1 is N-(1,3-dimethylbutyl)-N'-phenyl-p-phenylenediamine, obtainable from Harwick Standard under the tradename Stangard® 6PPD.

The Antidegradant 2 is 2,2,4-trimethyl-1,2-dihydroquinoline polymer, obtainable from Harwick Standard under the trade name Stangard® TMQ.

The Antidegradant 3 is a microcrystalline-paraffin blended wax, obtainable from Akrochem under the trade name AKROWAX® 5084.

The curative is sulfur, obtainable from Georgia Gulf Sulfur Corp under the trade name Rubber Makers Sulfur.

The Accelerator 1 is N-cyclohexyl-2-benzothiazole sulfenamide, obtainable from Harwick Standard under the trade name KEMAI CBS GR.

The Accelerator 2 is diphenyl guanidine, obtainable from Harwick Standard under the trade name Ekaland DPG C.

Table 1 lists the test procedures for evaluating the vulcanized (cured) rubber compositions.

TABLE 1

| Performance Indicator | Measurement | Equipment | Method |
|---|---|---|---|
| Processing Indicator | Mooney Viscosity, ML(1 + 4) 100° C. | Monsanto MV2000 | ASTM D-1646 |
| Processing Indicator | Mooney Scorch, 3 point rise | Monsanto MV2000 | ASTM D-1646 |

TABLE 1-continued

| Performance Indicator | Measurement | Equipment | Method |
|---|---|---|---|
| Rolling Resistance Indicator | RPA Strain Sweep G' at 60° C. | TA Instruments RPA | MPM Internal Test Method |
| Rolling Resistance Indicator | RPA tanδ at 60° C., max | TA Instruments RPA | MPM Internal Test Method |
| Rolling Resistance Indicator | RPA Payne Effect | TA Instruments RPA | MPM Internal Test Method |
| Wear Indicator | DIN Abrasion (mass loss) | DIN Rotary Abrader | ASTM D-5963 |
| Handling Indicator | Shore A Hardness | Zwick Shore Hardness Tester | ASTM D-2240 |
| Grip Indicator | Rebound at 70° C., 100° C. | Zwick 5109 Rebound Resilience Tester | ASTM D-7121 |
| Wear Indicator | Reinforcing Index | Zwick Ring Tester | ASTMD-412 |
| Endurance | High Speed Tear Energy (HSTE) | Zwick HIT50P | ASTM D-624 |
| Processability | Viscosity | Monsanto moving die rheometer, model MDR 2000 | ASTM F-5289-12 |
| Wear Indicator | Tensile Strength | Zwick Ring tester | ASTMD-412 |
| Handing Indicator | Modulus | Zwick Ring tester | ASTMD-412 |
| Wear Indicator | % Elongation | Zwick Ring tester | ASTMD-412 |

Rubber processing analyzer is abbreviated as RPA.

Example 1

Preparation of Composition A

Chloropropyltriethoxysilane (133.6 grams, 0.56 moles), o-phenylenediamine (60.0 grams, 0.56 moles) and xylenes (100.0 grams) were charged into a 1-L round bottom flask, equipped with a mechanical stirrer, an addition funnel, a 6-inch Vigreux column, a short path distillation head, a heating mantle, and a temperature controller. Sodium ethoxide (21 wt. % in ethanol, 170.8 grams, 0.53 moles) was charged into the addition funnel. The reaction mixture in the flask was stirred and heated to 160° C. for 2 hours before adding sodium ethoxide through addition funnel. Sodium ethoxide was slowly added over the course of 7-8 hours while maintaining the reaction temperature at 160° C. After finishing adding sodium ethoxide, the pot temperature was reduced slowly.

The solids from the reaction mixture were removed through centrifugation. The organics were washed with 30% ethylenediamine/ethylenediamine hydrochloride solution three times to remove the unreacted o-phenylenediamine. After washing, the organics were stripped under vacuum to remove the solvents as well as low boiling washing reagents and 122 grams of Composition A was recovered.

Example 2

Preparation of Composition A

A quantity of o-phenylenediamine (220.4 grams, 2.04 moles) and a mixture of xylene isomers (406.4 grams) were charged into a reactor. The reactor is a 5-Liter round bottom flask supported by a heating mantle powered by a temperature controller. The flask was equipped with a mechanical stirrer, an addition funnel, and a 15-cm Vigreux column fitted with a distillation head with controlled takeoff. Then a mixture of chloropropyltriethoxysilane (492.7 grams, 2.05 moles) and hexadecane (42.3 grams) was added into the flask. The reaction mixture was maintained under an atmosphere of dry nitrogen with stirring. The reaction mixture was heated to 160° C. and held for 67 minutes before adding sodium ethoxide through addition funnel. Then sodium ethoxide (21 wt. % in ethanol, 616.0 grams, 1.90 moles) was added at a constant rate via the addition funnel over 6 hrs.

The reaction mixture was then cooled to room temperature and the liquid layer was decanted from the solids. The solids were subsequently rinsed with toluene. The organic layers were combined and vacuum stripped at 0.1 torr, producing a dark purple liquid, which was placed into a freezer at −20° C. for ~2 days. Additional solids formed and the organic layer was again decanted away from the solids. The organic layer was further vacuum stripped at elevated temperature at 0.1 torr, leaving behind a clear, dark purple liquid Composition A.

Example 3

Preparation of Composition B

Chloropropyltriethoxysilane (0.25 moles), chlorobutyldimethylethyoxysilane (0.28 moles), o-phenylenediamine (0.50 moles) and xylenes (100.0 grams) are charged into a 1-L round bottom flask, equipped with a mechanical stirrer, an addition funnel, a 6-inch Vigreux column, a short path distillation head, a heating mantle, and a temperature controller. Sodium ethoxide (170.8 grams, 21% in ethanol, 0.53 moles) is charged into the addition funnel. The reaction mixture in the flask is stirred and heated to 160° C. for 2 hours before adding sodium ethoxide. Sodium ethoxide is slowly added over the course of 7-8 hours while maintaining the reaction temperature at 160° C. Then, the pot temperature is cooled down slowly.

The solids from the reaction mixture are removed through centrifugation. The organics are washed with 30% ethylenediamine/ethylenediamine hydrochloride solution three times to remove the unreacted o-phenylenediamine. After washing, the organics are stripped under vacuum to remove the solvents as well as low boiling washing reagents and Composition B is recovered.

Example 4

Preparation of Composition B

Chloropropyltriethoxysilane (0.25 moles), o-phenylenediamine (0.50 moles) and xylenes (100.0 grams) are charged into a 1-L round bottom flask, equipped with a mechanical stirrer, an addition funnel, a 6-inch Vigreux column, a short path distillation head, a heating mantle, and a temperature controller. The reaction mixture in the flask is stirred and heated to 160° C. for 2 hours. Then, chlorobutyldimethylethyoxysilane (0.28 moles) is added to the flask. The reaction mixture in the flask continues to react for 2 hours. Then sodium ethoxide (170.8 grams, 21% in ethanol, 0.53 moles) is slowly added over the course of 7-8 hours while maintaining the reaction temperature at 160° C. The pot temperature is cooled down slowly.

The solids from the reaction mixture are removed through centrifugation. The organics are washed with 30% ethylenediamine/ethylenediamine hydrochloride solution three times to remove the unreacted o-phenylenediamine. After washing, the organics are stripped under vacuum to remove the solvents as well as low boiling washing reagents and Composition B is recovered.

COMPARATIVE EXAMPLES

Preparation and Evaluation of a Rubber Composition

Table 2 lists the ingredients used for preparing rubber compositions using an 80/20 blend of Natural Rubber/Cis 1,4-Polybutadiene, and containing Vulcan® 9 carbon black (control) and silica coupled silanes using TESPT and Composition A. Composition A is a silane of this invention.

TABLE 2

| | Rubber Comprising Carbon Black (PHR (part per hundred rubber)) | Rubber Comprising TESPT Silane (PHR (part per hundred rubber)) | Rubber Comprising Composition A (PHR (part per hundred rubber)) |
|---|---|---|---|
| Ingredients | | | |
| 1st Non-Productive (NP1) | | | |
| Natural Rubber | 80.0 | 80.0 | 80.0 |
| Cis 1,4-Polybutadiene | 20.0 | 20.0 | 20.0 |
| Silica | 0.0 | 50.0 | 50.0 |
| Carbon Black | 25.0 | 5.0 | 5.0 |
| TDAE Process Oil | 1.0 | 1.0 | 1.0 |
| TESPT silane | 0.0 | 4.0 | 0.0 |
| Composition A | 0.0 | 0.0 | 4.0 |
| Zinc Oxide | 1.5 | 1.5 | 1.5 |
| Stearic Acid | 1.0 | 1.0 | 1.0 |
| NP1 Total | 128.5 | 162.5 | 162.5 |
| 2nd Non-Productive (NP2) | | | |
| Carbon Black | 25.0 | 5.0 | 5.0 |
| N-(1,3-dimethylbutyl)-N'-phenyl-p-phenylene-diamine (6-PPD) | 2.0 | 2.0 | 2.0 |
| 2,2,4-trimethyl-1,2-dihydroquinoline polymer (TMQ) | 0.5 | 0.5 | 0.5 |
| Microcystalline Wax | 1.3 | 1.3 | 1.3 |
| Zinc Oxide | 1.5 | 1.5 | 1.5 |
| Stearic Acid | 1.0 | 1.0 | 1.0 |
| NP2 Total | 159.8 | 173.8 | 173.8 |
| Productive | | | |
| Sulfur | 1.600 | 1.600 | 1.600 |
| N-cyxlohexyl-2-benzothiazole sulfen-amide (CBS) | 1.100 | 2.000 | 2.000 |
| diphenyl guanidine (DPG) | 0.4 | 0.4 | 0.4 |
| Final Productive Mix Total | 162.9 | 177.8 | 177.8 |

The silica-containing formulations require slightly more N-cyclohexyl-2-benzothiazole sulfenamide (CBS) due to the tendency of silica to absorb this accelerator to its surface. The three formulations were mixed in an internal rubber mixer utilizing a mixing procedure involving two sequential non-productive mixing steps followed by a final productive mix. The silica formulation containing TESPT was heat treated (to drive the needed silanization reaction) for 150 secs at 145° C. during the two non-productive passes. The silica formulation containing Composition A was heat treated for 90 secs at 155° C. during the two non-productive passes.

All three formulations were mixed with curatives in the final productive mix for 180 secs at 105° C. The rubber compositions were cured at 160° C. for 15 mins.

Table 3 lists the resulting physical and dynamic properties for three rubber compositions.

TABLE 3

| Sample | Carbon Black | TESPT Silane | Composition A |
|---|---|---|---|
| Mooney | | | |
| Plasticity ML1 + 4 at 100° C. (MU) | 75.4 | 70.2 | 144.2 |
| Scorch Ts3 (minutes) | 8.3 | 12.6 | 7.6 |
| Rheometer, 160° C. | | | |
| Max. Torque, dNm | 21.26 | 22.80 | 19.35 |
| Min. Torque, dNm | 3.13 | 2.78 | 3.57 |
| Delta Torque, dNm | 18.1 | 20.0 | 15.8 |
| Stress-Strain | | | |
| Tensile Strength, MPa | 22.7 | 21.7 | 19.2 |
| Elongation @ Break, % | 504 | 498 | 454 |
| 100% Modulus, MPa | 2.3 | 2.4 | 1.8 |
| 300% Modulus, MPa | 12.4 | 12.5 | 11.3 |
| Reinforcing Index | 5.5 | 5.2 | 6.4 |
| Shore A Hardness | | | |
| Shore A @25° C. | 62.0 | 63.3 | 58.7 |
| Durability | | | |
| High Speed Tear Energy (HSTE), $MJ/m^3$ | 6.7 | 6.9 | 6.7 |
| DIN Abrasion loss, $mm^3$ | 95.8 | 99.7 | 92.8 |
| Dynamic Properties | | | |
| Cured RPA strain sweep G' @ 10% strain, 60° C., MPa | 2.2 | 2.4 | 1.8 |
| Cured RPA Tan δ @ 10% strain, 60° C. | 0.164 | 0.140 | 0.100 |
| Cured RPA Payne Effect, MPa | 6.58 | 5.23 | 2.74 |
| Rebound @ 70° C. | 55.1 | 58.7 | 60.9 |
| Rebound @ 100° C. | 59.0 | 62.4 | 63.9 |

The Shore A hardness for the rubber composition comprising Composition A is lower than that of both Carbon black and TESPT rubber compositions.

The higher Mooney Viscosity observed for the rubber composition comprising Composition A is possibly due to the silane crosslinking with the polymer(s) by the Diels Alder mechanism or free-radical initiated direct crosslinking with the polymer during the mixing process.

The scorch safety and cure behavior of the rubber composition comprising Composition A is comparable to TESPT rubber composition. The higher minimum torque observed in the rubber composition comprising Composition A is due to a much higher viscosity of the green compound. Delta torque is generally related to the degree of sulfur crosslinking; thus, it is possible that the rubber composition comprising Composition A has a lower degree of crosslinking compared to carbon black and TESPT rubber compositions.

The likely pre-crosslinking of the polymer by the silane during the mixing process also makes this the likely scenario.

The rubber composition comprising Composition A has greater stiffness (Reinforcing Index) than both carbon black and TESPT rubber compositions. The reinforcement enhancement is a positive indicator for improved wear and abrasion resistance.

The slightly lower tensile strength and elongation for the rubber composition comprising Composition A can be ascribed to the shorter, slightly stronger C—N bonds present in the matrix. The three batches have comparable high-speed tear energies, an indicator for cut and chip resistance in natural rubber tire formulations.

The rubber composition comprising Composition A provides excellent abrasion resistance in the silica compound, as measured using a DIN abrader.

The Payne Effect, a measure of the extent of the filler-filler interaction, is significantly lower for the rubber composition comprising Composition A. This is likely due as well to the pre-crosslinking between the silane and the polymer during the mixing process, which minimizes the opportunity of the filler aggregates to re-flocculate. Tire rolling resistance, related to the deformation of a tire at a frequency of 10-100 HZ and a temperature of 50-70° C., is proportional to tan δ, a ratio of viscous modulus to elastic modulus under cyclic deformation. Table 3 shows that the rubber composition comprising Composition A has a much lower tan δ value than carbon black and TESPT rubber compositions. Thus, it appears that the rubber composition comprising Composition A can minimize trade-off in wear resistance and rolling resistance in natural rubber tire formulations.

What is claimed is:

1. A composition comprising at least one silane functional amine, wherein the at least one silane functional amine is a compound of formula (I): $(R^1)_a$-G-$(NR_2)_b$; and further wherein:

G is an unsaturated cyclic moiety;

each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each R is independently selected from the group consisting of hydrogen and -L-$SiX^1X^2X^3$; with the proviso that at least one R is hydrogen and at least two R is -L-$SiX^1X^2X^3$;

each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;

each $X^1$ is independently selected from the group consisting of hydroxyl, —$OR^2$ and —OC(═O)$R^2$;

each $X^2$ and each $X^3$ are independently selected from the group consisting of hydroxyl, —$OR^2$, —OC(═O)$R^2$ and $R^2$;

each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

a is 0, 1, 2, 3, 4, 5, 6, 7, 8, 9, 10, or 11; and b is 2.

2. The composition of claim 1, wherein G is selected from the group consisting of a benzene ring and a pyridine ring.

3. The composition of claim 1, wherein the compound of formula (I) is selected from the group consisting of

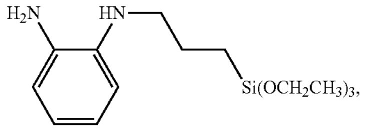
,
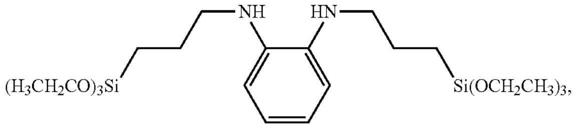
,
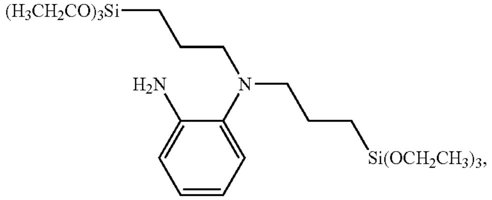
,
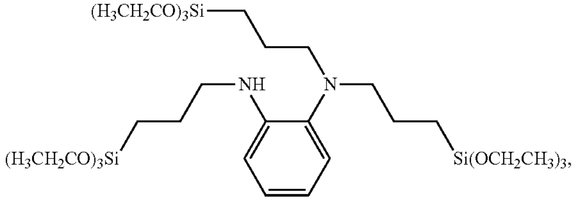
, and combinations thereof.

4. The composition of claim 1, wherein the compound of formula (I) is selected from the group consisting of

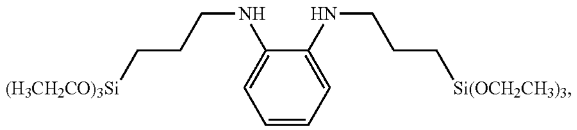
,
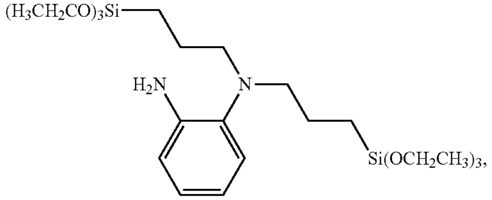
,
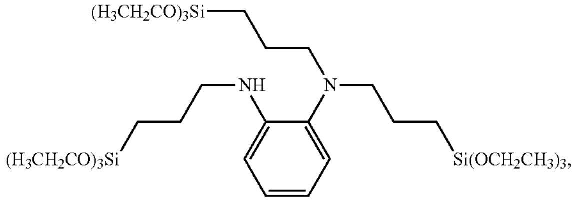
, and combinations thereof.

5. A method for preparing the composition comprising at least one silane functional amine of claim 1, comprising reacting a compound of formula (II): $(R^1)_a$-G-$(NH_2)_b$, with one or more compounds of formula (III): M-L-$SiX^1X^2X^3$;

wherein the total molar ratio of compounds of formula (III) to the compound of formula (II) is from 3.0:1 to 0.1:1; and further wherein:

G is an unsaturated cyclic moiety;

each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;

each $X^1$ is independently selected from the group consisting of hydroxyl, $—OR^2$ and $—OC(=O)R^2$;

each $X^2$ and each $X^3$ are independently selected from the group consisting of hydroxyl, $—OR^2$, $—OC(=O)R^2$ and $R^2$;

each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each M is independently halogen;

a is 0, 1, 2, 3, 4, 5, 6, 7, 8, 9, 10, or 11; and b is 2.

6. The method of claim 5, wherein G is selected from the group consisting of a benzene ring and a pyridine ring.

7. The method of claim 5, wherein the at least one silane functional amine is selected from the group consisting of

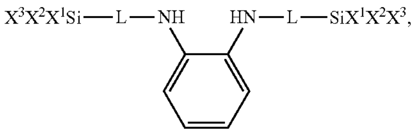

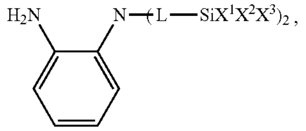

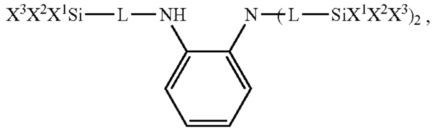

and combinations thereof.

8. The method of claim 5, wherein the total molar ratio of compounds of formula (III) to the compound of formula (II) is from 1.5:1 to 0.7:1.

9. The method of claim 5, wherein each M is independently chloro, bromo or iodo.

10. The method of claim 5, wherein the reacting occurs in the presence of a base.

11. The method of claim 10, wherein the base is an alkali metal alkoxide.

12. A rubber composition comprising:

(a) a composition comprising at least one silane functional amine, wherein the at least one silane functional amine is a compound of formula (I): $(R^1)_a$-G-$(NR_2)_b$; and further wherein:

G is a saturated or an unsaturated cyclic moiety;

each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

each R is independently selected from the group consisting of hydrogen and -L-$SiX^1X^2X^3$, with the proviso that at least one R is hydrogen and at least one R is -L-$SiX^1X^2X^3$;

each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;

each $X^1$ is independently selected from the group consisting of hydroxyl, $—OR^2$ and $—OC(=O)R^2$;

each $X^2$ and each $X^3$ are independently selected from the group consisting of hydroxyl, $—OR^2$, $—OC(=O)R^2$ and $R^2$;

each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

a is 0, 1, 2, 3, 4, 5, 6, 7, 8, 9, 10, or 11; and b is 1 or 2;

(b) at least one diene-based polymer;

(c) silica;

(d) at least one process aid; and (e) a vulcanizing package comprising at least one vulcanizing agent comprising sulfur and at least one accelerator.

13. The rubber composition of claim 12, wherein G of the at least one silane functional amine of (a) is selected from the group consisting of a benzene ring, a cyclohexane ring, and a pyridine ring.

14. The rubber composition of claim 12, wherein the compound of formula (I) of the at least one silane functional amine of (a) is selected from the group consisting of

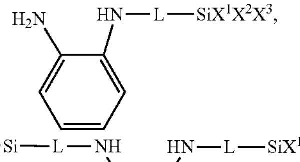

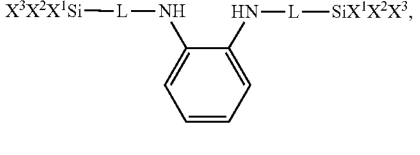

-continued

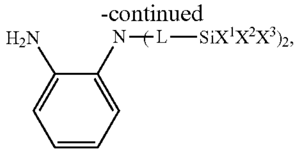

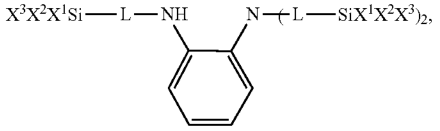

and combinations thereof.

15. The rubber composition of claim 12, wherein the at least one diene-based polymer is a diene-based polymer containing at least one functional group, a diene-based polymer containing no functional group, or combinations thereof.

16. The rubber composition of claim 12, wherein the at least one diene-based polymer is natural rubber, polyisoprene, a polybutadiene, styrene-butadiene copolymer (SBR), or combinations thereof.

17. The rubber composition of claim 16, wherein the at least one diene-based polymer is natural rubber, cis 1,4-polyisoprene, cis 1,4-polybutadiene, or combinations thereof.

18. A rubber composition comprising:
- (i) about 100 parts of rubber, where the weight of the rubber is the sum of the weights of each diene-based polymer containing at least one functional group used in the composition and the weights of each diene-based polymer containing no functional group used in the composition;
- (ii) about 1 to about 20 parts by weight per 100 parts rubber (i) of the composition comprising at least one silane functional amine, wherein the at least one silane functional amine is a compound of formula (I): $(R^1)_a$-G-$(NR_2)_b$; and further wherein:
  - G is a saturated or an unsaturated cyclic moiety;
  - each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
  - each R is independently selected from the group consisting of hydrogen and -L-$SiX^1X^2X^3$, with the proviso that at least one R is hydrogen and at least one R is -L-$SiX^1X^2X^3$;
  - each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;
  - each $X^1$ is independently selected from the group consisting of hydroxyl, —$OR^2$ and —OC(═O)$R^2$;
  - each $X^2$ and each $X^3$ are independently selected from the group consisting of hydroxyl, —$OR^2$, —OC(═O)$R^2$ and $R^2$;
  - each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
  - a is 0, 1, 2, 3, 4, 5, 6, 7, 8, 9, 10, or 11; and
  - b is 1 or 2;
- (iii) about 5 to about 140 parts by weight per 100 parts rubber (i) of silica;
- (iv) about 0.1 to about 10 parts by weight per 100 parts rubber (i) of at least one process aid; and
- (v) about 0.1 to about 20 parts by weight per 100 parts rubber (i) of a vulcanization package comprising at least one vulcanizing agent comprising sulfur and at least one accelerator.

19. The rubber composition of claim 18, wherein G of the at least one silane functional amine of (ii) is selected from the group consisting of a benzene ring, a cyclohexane ring, and a pyridine ring.

20. The rubber composition of claim 18, wherein the compound of formula (I) of the at least one silane functional amine of (ii) is selected from the group consisting of

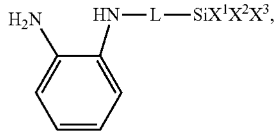

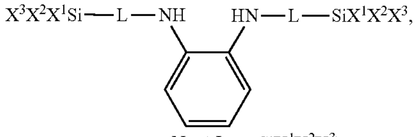

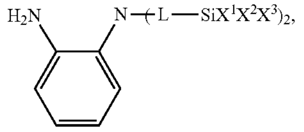

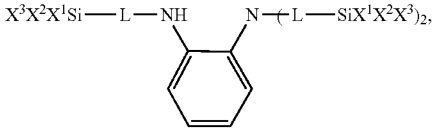

and combinations thereof.

21. A process of preparing a rubber composition comprising adding a composition comprising at least one silane functional amine, wherein the at least one silane functional amine is a compound of formula (I): $(R^1)_a$-G-$(NR_2)_b$; and further wherein:
- G is a saturated or an unsaturated cyclic moiety;
- each $R^1$ is independently selected from the group consisting of an alkoxyl group having from 1 to 20 carbon atoms, an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;
- each R is independently selected from the group consisting of hydrogen and -L-$SiX^1X^2X^3$; with the proviso that at least one R is hydrogen and at least one R is -L-$SiX^1X^2X^3$;
- each L is independently selected from the group consisting of an alkylene group having from 1 to 20 carbon atoms and optionally at least one heteroatom, an alkenylene group having from 2 to 20 carbon atoms, a cycloalkylene group having from 3 to 10 carbon atoms, an arylene group having from 6 to 12 carbon atoms, and an aralkylene group having from 7 to 14 carbon atoms;

each $X^1$ is independently selected from the group consisting of hydroxyl, —$OR^2$ and —$OC(=O)R^2$;

each $X^2$ and each $X^3$ are independently selected from the group consisting of hydroxyl, —$OR^2$, —$OC(=O)R^2$ and $R^2$;

each $R^2$ is independently selected from the group consisting of an alkyl group having from 1 to 20 carbon atoms, an alkenyl group having from 2 to 20 carbon atoms, a cycloalkyl group having from 3 to 10 carbon atoms, an aryl group having from 6 to 12 carbon atoms, and an aralkyl group having from 7 to 14 carbon atoms;

a is 0, 1, 2, 3, 4, 5, 6, 7, 8, 9, 10, or 11; and b is 1 or 2;

and silica to at least one diene-based polymer.

22. An article of manufacture comprising the rubber composition of claim 18, wherein the article of manufacture is a tire or engine mount.

* * * * *